(12) United States Patent
Ethen et al.

(10) Patent No.: US 7,092,940 B1
(45) Date of Patent: Aug. 15, 2006

(54) AUTOMATION OF COMPLEX USER-LEVEL COMMAND SEQUENCES FOR COMPUTING ARRANGEMENTS

(75) Inventors: Donald J. Ethen, New Brighton, MN (US); James R. Malnati, Stillwater, MN (US); Paul D. Urevig, Coon Rapids, MN (US)

(73) Assignee: Unisys Corporation, Blue Bell, PA (US)

( * ) Notice: Subject to any disclaimer, the term of this patent is extended or adjusted under 35 U.S.C. 154(b) by 612 days.

(21) Appl. No.: 09/858,268

(22) Filed: May 15, 2001

(51) Int. Cl.
*G06F 17/30* (2006.01)

(52) U.S. Cl. .................. 707/6; 707/3; 707/5; 707/100; 707/101; 709/201; 709/202; 717/121

(58) Field of Classification Search .............. 707/1–10, 707/100–101, 104.1; 717/121; 709/201–202
See application file for complete search history.

(56) References Cited

U.S. PATENT DOCUMENTS

| | | | |
|---|---|---|---|
| 5,742,746 A * | 4/1998 | Doi et al. .................. 358/1.16 |
| 5,764,974 A * | 6/1998 | Walster et al. ................. 707/6 |
| 5,794,239 A * | 8/1998 | Walster et al. ................. 707/6 |
| 5,900,024 A * | 5/1999 | Morearty .................... 712/225 |
| 6,154,787 A * | 11/2000 | Urevig et al. .................. 710/8 |
| 6,226,659 B1 * | 5/2001 | Wong et al. ................. 715/526 |
| 6,292,797 B1 * | 9/2001 | Tuzhilin et al. ................ 707/6 |
| 6,374,207 B1 * | 4/2002 | Li et al. ....................... 703/27 |
| 2001/0010056 A1 * | 7/2001 | Nishigaya et al. .......... 709/202 |

OTHER PUBLICATIONS

Hsu et al., "A message passing coprocessor for distributed memory multicomputers", Proceedings of the 1990 ACM/IEEE conference on Supercomputing, pp. 720-729, Year of Publication: 1990.*

* cited by examiner

*Primary Examiner*—Khanh B. Pham
(74) *Attorney, Agent, or Firm*—Charles A. Johnson; Mark T. Starr; Crawford Maunu PLLC (57) ABSTRACT

Method and system for automating operations of a computing arrangement. A pattern database is configured with pattern definitions and associated response definitions, and one or more of the response definitions include one or more commands for operating the computing arrangement. A message processor receives messages from components in the computing arrangement and matches the messages against the patterns in the database. If a message matches a pattern, the message processor performs the actions specified in the associated response definition. One or more of the response definitions queue commands to a command queue. The message processor then dequeues and issues the commands at times that are compatible with the operation being automated.

8 Claims, 2 Drawing Sheets

AUTOMATION OF COMPLEX USER-LEVEL COMMAND SEQUENCES FOR COMPUTING ARRANGEMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to automating operator command sequences input to a computing arrangement, and more particularly to automating operator command sequences by matching messages from the computing arrangement and generating commands based on the messages matched.

BACKGROUND OF THE INVENTION

Single Point Operations software supports centralized control and automated operations of multiple data processing systems. As a part of the Single Point Operations software, Single Point Autoaction Message System (SP-AMS) software supports automated operations. SP-AMS is a utility that allows a user to specify messages to match and actions to perform when a message is received and matched.

Some systems require extremely complex sequences of commands to be entered by an operator in order to take advantage of certain system capabilities. For example, the Symmetrix storage system from EMC has disaster recovery capabilities that require operator knowledge of which disk groups are attached to which data processing system and entry of a long sequence of cryptic commands in a particular order. Proper use of this capability requires extensive training of operators. Even with proper training, however, the entry of commands may be error prone. Thus, Single Point Operations software and SP-AMS would appear to be suitable for automating operations of systems such as the Symmetrix storage system.

The Symmetrix storage system is configurable to provide data storage for multiple host data processing systems, and the storage space is separately administered for each host. Certain administrative operations performed on the Symmetrix system, for example, a remote copy, can be performed simultaneously for different host systems. The complex command sequences required to perform these operations and the need for multiple host systems to perform these operations simultaneously makes automation of these operations a non-trivial task. While SP-AMS software is generally used for automating complex command sequences, SP-AMS does not include support of multi-threaded command sequences.

A method and system that address the aforementioned problems, as well as other related problems, are therefore desirable.

SUMMARY OF THE INVENTION

In various embodiments, the invention provides a method and system for automating operations of a computing arrangement. A pattern database is configured with pattern definitions and associated response definitions, and one or more of the response definitions include one or more commands for operating the computing arrangement. A message processor receives messages from components in the computing arrangement and matches the messages against the patterns in the database. If a message matches a pattern, the message processor performs the actions specified in the associated response definition. One or more of the response definitions queue commands to a command queue. The message processor then dequeues and issues the commands at times that are compatible with the operation being automated.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

The present invention is described by way of a specific example involving automation of a remote copy operation for the Symmetrix storage system. It will be appreciated that the methods and apparatus presented in the specific example are adaptable to automation of other complex operations for other types of computing arrangements. Therefore, the features of the example serve to illustrate and are not intended to limit applications of the invention.

Figure 1:
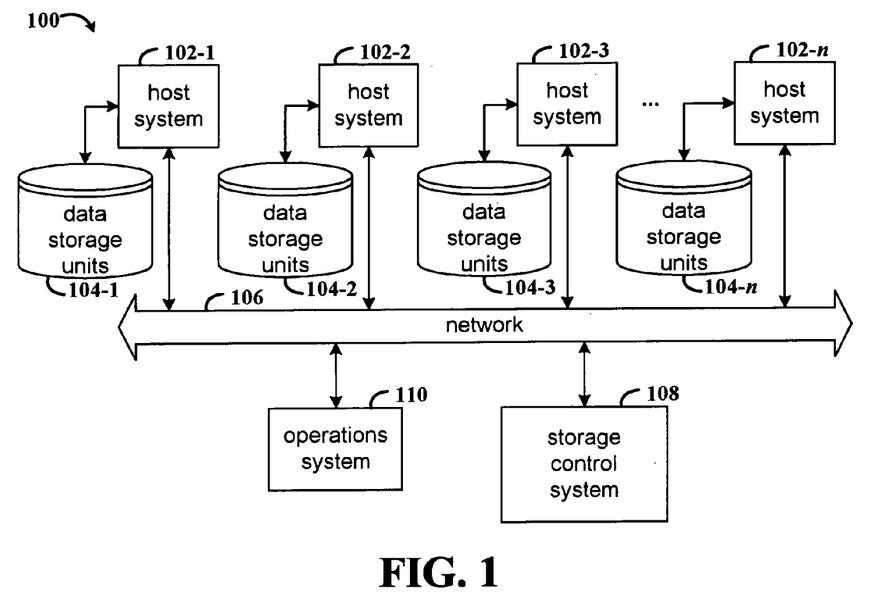
FIG. 1 is a functional block diagram of a computing arrangement configured in accordance with one embodiment of the invention.

FIG. 1 is a functional block diagram of a computing arrangement configured in accordance with one embodiment of the invention. Computing arrangement 100 includes multiple host data processing systems ("hosts"), 102-1–102-n, each coupled to a respective set of data storage units 104-1–104-n. The hosts are coupled to operations system 110 and storage control system 108 via network 106. Depending on the computing requirements of arrangement 100, hosts 102 are systems configured with the same operating system or alternatively, are different computing systems configured with different operating systems.

Each host controls and provides access to data stored on the local data storage units. For example, host 102-1 provides access to data stored in data storage units 104-1. The data storage units 104-1–104-n are Symmetrix storage systems, and various administration operations are provided by way of storage control system 108. For example, storage control system 108 is a data processing system that hosts EMC ControlCenter™ (ECC) software from EMC. A component of ECC, SRDF/TimeFinder Manager (TimeFinder) software provides split and establish functions for a Business Continuance Volume (BCV) and failover and failback functions for the Symmetrix Remote Data Facility (SRDF). With the TimeFinder software, the BCV and SRDF functions can be centrally performed for the disk storage units 104-1–104-n that are coupled to the hosts 102-1–102-n.

TimeFinder software provides a command line interface and also supports script-based entry of commands. Thus, a complex operation can be performed in a full manual mode or partially automated with a script. However, in computing arrangements such as arrangement 100, multiple hosts may require performing complex operations for administering the data storage units independent of one another. For example, a BCV operation may be required on data storage units 104-1 at the same time that an SRDF operation is required on data storage units 104-n. While the TimeFinder software supports concurrent administration of the different data storage units, coordinating the different complex operations further complicates the scenario.

In order to automate and support concurrent operations with the TimeFindersupported scripts, two DOS windows are required. However, the Symmetrix has only one database. This database gets locked to all commands during the execution and until completion of the current command. For example, after execution of the split command, control is returned to the communications session and another command may be entered to start another operation, even as the split of the BCV group is underway in the background. Furthermore, even though the split command may be reported as having been executed, an establish command may not be accepted until all devices are split. The scripting solution addresses this situation by waiting a certain period of time with the expectation that the prior operation is complete. However, while under normal operating conditions the selected wait period may be suitable, unforeseen circumstances may cause the prior operation to take longer than expected and introduce the possibility of an error and data corruption. The present invention improves on this situation by probing the storage control system and continuing with the next step in the process only after receiving notification that the required state has been achieved.

Operations system 110 is a computing arrangement configured to fully automate one or more complex operations performed by storage control system 108. In one embodiment, operations system 110 is configured with Single Point Operations (SPO) software from Unisys. The SPO software includes the Single Point Auto-action Message System (SP-AMS) component, which is configurable to match incoming messages to user-defined patterns and issue one or more user-defined responses when a message matches a pattern. To support full automation of concurrent complex operations performed by storage control system 108 on multiple data storage units 104-1–104-n, the operations system is configured to interface with the command line interface of the TimeFinder software via a terminal emulation session. Furthermore, the message processor and pattern database on the operations system are configured to match messages from and queue commands to the TimeFinder software for concurrent operations on the data storage units 104-1–104-n.

Figure 2:
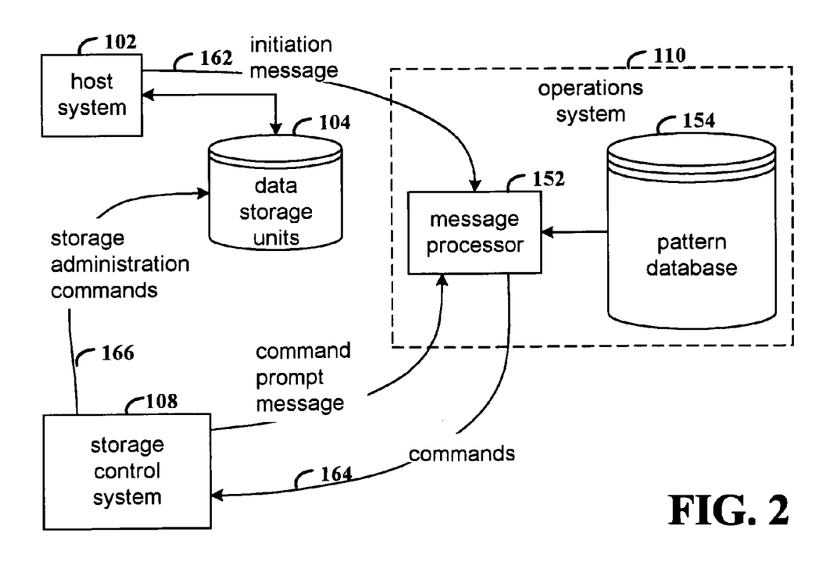
FIG. 2 is a data flow diagram that illustrates, in part, the data exchanged between a host, a message processor, and a storage control system in automating a complex operation.

FIG. 2 is a data flow diagram that illustrates, in part, the data exchanged between a host 102, message processor 152, and the storage control system 108 in automating a complex operation. Operations system 110 is configured with a message processor 152 and a pattern database 154. For example, the message processor and pattern database are implemented with the SP-AMS software. The message processor communicates with software on the storage control system 108 via a terminal emulator and communicates with the host system via a host-specific interface. At the user's instruction, the message processor initiates a dialogue with the storage control system.

Using database maintenance software that accompanies the SP-AMS software, pattern database 154 is created from an input specification such as that provided in the Appendix to this document. For illustration purposes only, pattern database 154 refers to the database created from the input specification in the Appendix. Message processor 152 receives messages from both host system 102 and from storage control system 108 and matches the input messages to patterns in the pattern database 154.

In the general case of automating a complex operation, the host system sends a message to the message processor to initiate the operation. The initiation message is represented by line 162. The message processor searches pattern database 154 for a pattern that matches the initiation message. If a matching pattern is found, the complex operation commences with the message processor sending a command to the storage control system as shown by line 164.

While not shown, it will be appreciated from the specification set forth in the Appendix that the message processor queues commands before transmission to the storage control system. A command is dequeued and sent when the terminal emulator software returns a command prompt message from the storage control system 108 and the message processor matches the command prompt pattern in the pattern database. Line 166 illustrates the transmission of storage administration commands from the storage control system to a service processor (not shown) in the data storage unit 104. For example, for the Symmetrix storage units, the storage control system 108 is coupled to the service processor via a direct cable connection.

Depending on the particular type of host system 102, the pattern database may include additional patterns and associated responses for other messages sent to the host. For example, during the course of performing the complex operation, the message processor may generate various status messages indicating the results of commands issued to the storage control system.

Figure 3:
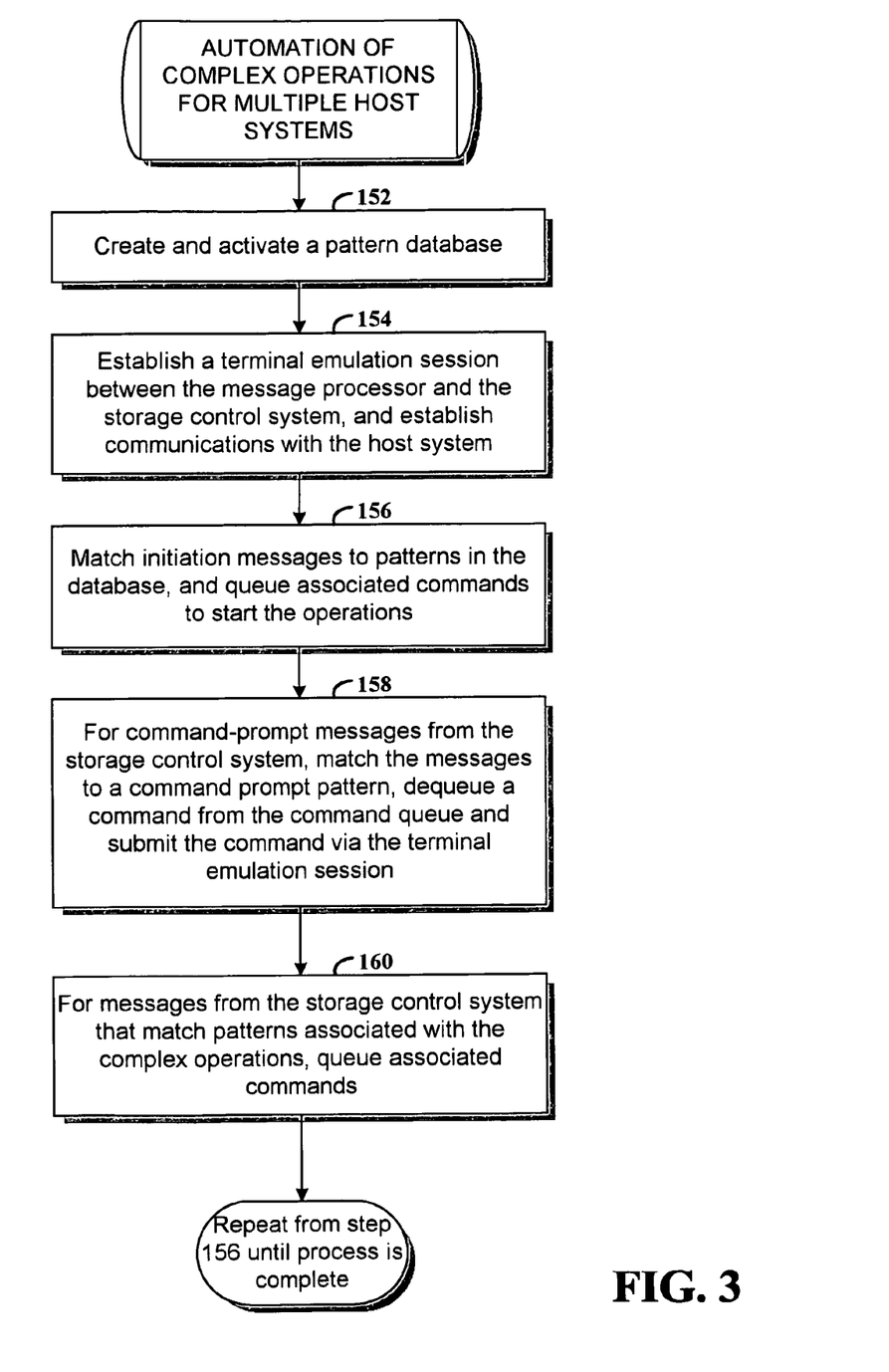
FIG. 3 is a flowchart of a process for automating concurrent complex operations for multiple host systems in accordance with one embodiment of the invention.

FIG. 3 is a flowchart of a process for automating concurrent complex operations for multiple host systems in accordance with one embodiment of the invention. The general control flow will be described with reference to the Appendix, which more specifically sets forth the patterns and associated response definitions that implement automation of the complex operation.

At step 152, the pattern database is created and activated. As previously discussed, in the example embodiment the pattern database is created using the SP-AMS software. The database specification set forth in the Appendix implements the remote copy operation for Symmetrix disk storage systems that are coupled to a Unisys IX data processing system, or multiple partitions thereof.

At step 154, a terminal emulation session is established between the message processor and the storage control system. This allows the message processor to submit commands via a command line interface and receive messages from the storage control system. The message processor also establishes communications with the host at step 154. The particular interface through which communications are established with the host is system dependent. For example, the interface to a Unisys IX system is via a console processor.

In the example database, a complex operation begins when the host sends an initiation message to the message processor. The initiation message can be generated either at a scheduled (programmed) time or manually via operator input (ad hoc). When an initiation message is matched, the associated response definition is processed, and a command is either immediately submitted to the storage control system if there are no commands waiting to be issued or queued if there are commands waiting to be issued.

In one embodiment, four command queues are defined and used in the response definitions for selected patterns in the pattern database. The queues include, in order of highest to lowest precedence, the flash queue, the immediate queue, the priority queue, and the routine queue. The flash queue is reserved for the INSTANT SPLIT command (operating on the local BCV group), from which it is executed instantly. The immediate queue is meant for requests to start another remote copy process.

The command queues are implemented as character string variables as illustrated at lines 50–77 of the Appendix. The commands within each command queue are delimited by the "_" character, as illustrated at line 370 of the Appendix.

At step 158, the message processor processes command prompt messages from the storage control system. The response associated with the command prompt pattern in the pattern database specifies removing a command from a command queue and submitting the command to the storage control system.

The queues are processed in precedence order. That is, the flash queue must be empty before commands in the immediate queue are processed, the immediate queue must be empty before commands in the priority queue are processed, and the priority queue must be empty before commands in the routine queue are processed. Within each queue, the commands are processed in first-in-first-out order.

For other messages from the storage control system, at step 160 the process matches the messages against patterns in the database and queues the associated command responses to a command queue.

At step 156, the process steps 156, 158, and 160 are repeated until the entire process is complete.

The description below further explains the automated remote copy operation as exemplified in the database specification in the Appendix.

The Remote Copy Process (RC) is a means by which data is moved automatically and error-free from one set of EMC disks to another. The scripts utilize SP-AMS to match messages sent to a telnet session, which is a DOS window into the Symmetrix NT system.

SP-AMS software provides control for SYMCLI commands that are sent by the automation. In this application, a console message from a host provides the trigger to start the Remote Copy. The message is sent to the console in the following form:
  START DATA TRANSFER DISKGROUP <bcv-_groupid>

The BCV groupid refers to a grouping of disks: Disks with the same groupid are operated on at the same time; the subject of BCV split and establish, etc. The algorithm for complete execution of the RC process follows. The SP-AMS and AMS patterns responsible for the automation are listed with each step. Note that the example is applicable to a Unisys IX system, where operator console automation is provided by way of an AMS database, which is separate from the SP-AMS database and is hosted on an operations console of the Unisys IX system. "AMS" refers to the database and/or software on the Unisys IX console, and SP-AMS refers to the database and/or software on the operations system 110. In this example, the pattern database 154 of the operations system operates in conjunction with a second pattern database configured for the operations console of the host.

1. Host message starts Remote Copy; console sends message to SPO—start the process for the named <bcv_groupid>.

| | |
|---|---|
| AMS: | Start_RC 1 |
| SP-AMS: | RC_Start 1 |

2. Verify all remote BCV split; verify local synchronization.

| | |
|---|---|
| SP-AMS: | RemNotSplit 1 |
| | RemNotSplit 2 |
| | RemSplitConf 1 |

3. Verify all local BCV established.

| | |
|---|---|
| SP-AMS: | LocNotEst 1 |
| | LocNotEst 2 |
| | LocEstConf 1 |

4. Loop until command lock free and no RDF in progress.

| | |
|---|---|
| SP-AMS: | LocEstConf 1 |

5. Lock for Pauseio.

| | |
|---|---|
| SP-AMS: | LocEstConf 1 |

6. Issue Pauseio command to host console.

| | |
|---|---|
| SP-AMS: | LocEstConf 1 |
| AMS: | PauseIO_Done 1 |

7. Host console sends instant split command to SPO for forwarding on to symm_host.

| | |
|---|---|
| AMS: | PauseIO_Done 1 |
| | PauseIO_Done 2 |
| | PauseIO_Done 3 |
| SP-AMS: | LocSplitSent 1 |

8. symm_host returns complete from split command. SPO sends automated answer to Pauseio read-and-reply message (takes from 6 to 12 seconds for Pauseio critical period).

| | |
|---|---|
| SP-AMS: | ResumeIO 1 |
| AMS: | AMS_Answer 1 |
| | ResumeIODone 1 |

9. Free Pauseio lock.

| | |
|---|---|
| SP-AMS: | ResumeIO 1 |

10. Verify all local split.

| SP-AMS: | ResumeIO 1 |
|---|---|
|  | LocSplitSent 2 |
|  | LocSplitSent 3 |
|  | LocSplitConf 1 |

11. Initiate RDF establish. A good copy of <bcv_groupid> has been received at the remote site (R1–R2). Set RDF in progress lock.

| SP-AMS: | LocSplitConf 1 |
|---|---|

12. RDF all synchronized. Initiate RDF split. Free RDF in progress lock.

| SP-AMS: | RDF_InProg 1 |
|---|---|
|  | RDF_InProg 2 |
|  | RDF_InProg 3 |
|  | RDF_InProg 4 |
|  | RDF_Est 1 |

13. RDF all split; initiate local BCV establish.

| SP-AMS: | RDFSplitSent 1 |
|---|---|
|  | RDFSplitSent 2 |
|  | RDFSplitSent 3 |
|  | RDFSplitConf 1 |

14. Local BCV all synchronized; initiate remote BCV establish.

| SP-AMS: | LocEstSent 1 |
|---|---|
|  | LocEstSent 2 |
|  | LocEstSent 3 |
|  | LocalEstConf 1 |

15. Remote BCV all synchronized; initiate remote BCV split.

| SP-AMS: | Rem_BCV_Est 1 |
|---|---|
|  | Rem_BCV_Est 2 |
|  | Rem_BCV_Est 3 |
|  | Rem_BCV_Est 4 |

16. Remote BCV all split. Remote Copy complete—notify console. Clean up.

| SP-AMS: | RemSplitSent 1 |
|---|---|
|  | RemSplitSent 2 |
|  | RemSplitSent 3 |
|  | RemSplitDone 1 |
|  | RC_Comp 1 |
|  | CleanUp 1 |
|  | CheckVars 1 |

The Remote Copy process has been designed to allow multiple partitions to move data simultaneously. While the symm_host telnet session can only process one command at a time, the Symmetrix Timefinder/SRDF facility allows more than one BCV/RDF group to be addressed and to be split or restored in parallel. This requires a queueing mechanism to store the commands and to retrieve and execute them when the command prompt is returned to the telnet session.

A global "Command_Lock" (variable) is given to the first to come to be served (FCFS). Commands that arrive while another command is in execution are queued to one of four prioritized command queues, Flash (highest precedence), Immediate, Priority or Routine (lowest precedence). The Flash queue is reserved for the INSTANT SPLIT command (operating on the local BCV group), from which it is executed instantly. The Immediate queue is meant for requests to start another RC process. The Priority queue holds most of the commands. Among the queues, each command is processed in the same order it was added to the queue; all commands in higher queues are executed before moving to the lower-precedence queue.

When the host console message triggers SP-AMS to start a remote copy, the remote copy begins what will include a 6-second race to the "split":

Host console sends message to SPO—okay to start Remote Copy

At an optimum time, SP-AMS sends "pauseio" command to IX host.

OS2200 "Pause Disk I/O for ClearPath OS2200" feature invoked

OS2200 stops all writes to disk

R/R console message indicates disk paused time; must not exceed 20 seconds from now until an automated answer is received Then the "critical period" begins (expect between 6- and 12-second delay).

In a flash, the SYMCLI command is executed to cause the instant split of an EMC Symmetrix device group In the initial device split to start the process, the BCV—R1 is created.

EMC feature instant split confirms all disk writes immediately allowing the host to resume normal operation; disk writes are trickled in.

SPO detects confirmation of instant split command, sends DONE to console.

host console AMS patterns provide a mechanism to answer the R/R console message.

This ends the "critical period."

In the event of a problem during the instant split (i.e. after the pauseio command is issued), it would be possible to have the operating system and it's disk I/O paused forever. This potential requires a timing mechanism be in place to automatically answer the read-and-reply message after a certain amount of time. Should this timer expire and the mechanism trigger the answer, the Remote Copy process is assumed to have failed.

This mechanism is a timed ANSWER action in the AMS database active on the host console. The pattern, PauseI-O_Done 1, is listed below. Note the use of the WAIT 20 SECONDS clause with the ANSWER action:

```
DEFINE "PauseIO_Done" 1
    MESSAGE "TO RESUME ALL DISK I/O WHEN DONE, ENTER DONE, ELSE ABORT:"
    /*   1-*--2---*-3-*-4--*-5-*-6--*--7--*--8--*--9--*-10-*--11-- */
    TYPE ANY-SENDER READ-AND-REPLY
    INSTANCE PRIMARY
    PRIORITY 128
    TOKEN KEYWORD 2 "RESUME"
    TOKEN FIXED 4 "DISK"
    TOKEN FIXED 7 "DONE,"
    TOKEN FIXED 11 "ABORT:"
    ACTION ALL HIGHLIGHT "WHITE"
    ACTION ALL DISPLAY \
        "OPS: Do not answer the \"TO RESUME ALL DISK I/O\" message!"
    IF RCLAST != "Local_BCV_Split_Sent"
        ACTION ALL EVENT-REPORT "TYPE=CO|CLASS=Host|INSTANCE=\symm_host\|" \
            "COMMAND=CREATE LocSplitSent \bcv_groupid\symmir -g \bcv_groupid\-noprompt -
instant split"
        SET RCLAST = "Local_BCV_Split_Sent"
        ACTION ALL COMMAND "RCLAST = Local_BCV_Split_Sent"
    ENDIF
    SET pauserrid = "\_RRID\"
    ACTION ALL WAIT 20 SECONDS ANSWER "\pauserrid\-ABORT"
    IF Console = "RESPONSE"
        ACTION ALL EVENT-REPORT \
"TYPE=LG|CLASS=Host|INSTANCE=\LogName\|APPL=$CONSOLE$|APPLQUAL=Pause|
O_Done_1|TEXT=\_MESSAGE\"
    ENDIF
END
```

When the RC process operates normally, the message is answered by the automation within the 20 seconds. The deadman's switch timer always expires. When the mechanism attempts to answer the message that is no longer outstanding at the console, no runtime error is incurred and the attempted action is ignored.

The Remote Copy process has a timer that exists on the host console. When an RC process is started, the variable "RC_Timer" is set to some non-null value. When the RC process completes, the variable is reset to null. The variable definition (shown below) has a TIMEOUT value of 60 minutes:

```
DEFINE VARIABLE "RC_Timer"
/* always set RC_Timer to some number of minutes, not seconds */
    TYPE STRING RETAINED
    TIMEOUT 60 MINUTES
    DEFAULT ""
END
```

Another variable, RC_In_Progress, is set to the BCV groupid that is in progress. When the RC_Timer and RC_In_Progress variables are first set to indicate the start of the process, the message pattern Start_RC 1 sends the "OM,M CHECK RC TIMER" command with a one minute delay:

```
DEFINE "Start_RC" 1
/* This message will normally come from a SAM (SMA) job */
/* e.g. START DATA TRANSFER DISKGROUP TAC */
/* The message must appear at all consoles, so if the SAM job does not */
/* send a message to all consoles, we have to do a TCOMMAND OM,M message */
/* so we can set RC_Timer properly in support of multiple console mode. */
    MESSAGE "\*8\START DATA TRANSFER DISKGROUP <disk_group>"
/*   ----1----*--2---*-3--*----4----*-----5------ */
    TYPE PRIVILEGED-EXEC OTHER
    INSTANCE ANY-INSTANCE
    PRIORITY 128
    TOKEN KEYWORD 2 "REMOTE"
    TOKEN FIXED 4 "DISKGROUP"
    TOKEN MASKED 1 "\*8\START"
    RESET RCLAST
    SET color = "WHITE"
    IF RC_In_Progress != ""
        IF Console = "RESPONSE"
            ACTION ALL EVENT-REPORT\
"TYPE=AL|CLASS=2200_Host|INSTANCE=$HOST$|APPL=\_DBNAME\|SEV=major|ALAR
MID=RC_Already_In_Progress|"\
            "ALARMQUAL=\_TOKEN1\.$HOST$.\_DT { }
2\|HELP=RemoteCopy/RC_Already_In_Progress|TEXT=Remote copy already in progress."
```

```
No action taken."
        ENDIF
        SET color = "YELLOW"
        ACTION ALL DISPLAY "Remote copy already in progress. No action taken."
    ELSE
        RESET SPO_Resumed
        SET bcv_groupid = "\_MESSAGE { }-1\"
        SET RC_In_Progress = "TRUE"
        IF Console = "RESPONSE"
            ACTION ALL EVENT-REPORT
"TYPE=CO|CLASS=Host|INSTANCE=\symm_host\|COMMAND=\_MESSAGE\NODE
$HOST$"
        ENDIF
/* Now kick off the console timer check for the process: */
        SET RC_Timer = "TRUE"
        IF Console = "RESPONSE"
            ACTION ALL WAIT 1 MINUTES TCOMMAND "OM,M CHECK RC TIMER"
        ENDIF
    ENDIF
    ACTION ALL HIGHLIGHT "\color\"
    IF Console = "RESPONSE"
        ACTION ALL EVENT-REPORT\
"TYPE=LG|CLASS=Host|INSTANCE=\LogName\|APPL=$CONSOLE$|APPLQUAL=Start_R
C_1\_RUNID\|TEXT=\_MESSAGE\"
    ENDIF
END
```

If the variable is reset in sixty minutes, the recurring timing message issued above detects this. In this case when it checks the RC_In Progress and finds a non-null value, the RC process is declared error-terminated and an alarm is sent to SPO (see RC_Timer 1 listed below).

```
DEFINE "RC_Timers" 1
    MESSAGE "\*8\CHECK RC TIMER"
    /*    ----1----*2-*--3-- */
    TYPE PRIVILEGED-EXEC OTHER
    INSTANCE ANY-INSTANCE
    PRIORITY 128
    TOKEN KEYWORD 2 "RC"
    TOKEN FIXED 3 "TIMER"
    TOKEN MASKED 1 "\*8\CHECK"
    SET color = "WHITE"
    ACTION ALL SUPPRESS
    SET RC_Timer_Loop = RC_Timer_Loop + 1
    IF RC_Timer_Loop = 32767
        RESET RC_Timer_Loop
    ENDIF
    IF RC Timer = ""
/* that means we timed out--check to see if we are still in progress: */
        IF RC In Progress != ""
/* then we are still in progress--alarm SPO and stop the automation! */
            IF Console = "RESPONSE"
                ACTION ALL EVENT-REPORT
"TYPE=CO|CLASS=Host|INSTANCE=\symm_host\|COMMAND=CLEAN UP \bcv_groupid\
FAIL"
                ACTION ALL EVENT-REPORT\
"TYPE=AL|CLASS=2200 Host|INSTANCE=$HOST$|APPL=\ DBNAME\|SEV=major|ALA
RMID=RC TimedOut!" \
                    "ALARMQUAL=\RC In Progress\.\bcv groupid\.\DT { }
2\|HELP=RemoteCopy/RC TimedOut|TEXT=Remote copy timed out. Last" \
                    "state: \RCLAST\"
            ENDIF
            SET color = "YELLOW"
            ACTION ALL DISPLAY "Remote copy timed out for diskgroup \bcv_groupid\!"
            ACTION ALL DISPLAY "Last state: \RCLAST\"
            IF Console = "RESPONSE"
                ACTION ALL TOOMMAND "OM,M CLEAN UP \bcv_groupid\"
                ENDIF
            ENDIF
        ELSE
            IF RC_In_Progress != ""
                IF Console = "RESPONSE"
                    ACTION ALL WAIT 1 MINUTES TCOMMAND "OM,M CHECK RC TIMER"
                ENDIF
```

-continued

```
            IF RC_Timer_Loop % 6 = 0
                SET color = "WHITE"
                ACTION ALL DISPLAY "Remote copy in progress for disk group \bcv_groupid\ . . . "
            ENDIF
        ELSE
/* do nothing to recheck the timer since we are done with the remote copy. */
            IF Console = "RESPONSE"
                ACTION ALL TCOMMAND "OM,M CLEAN UP \bcv_groupid\"
            ENDIF
        ENDIF
    ENDIF
    ACTION ALL HIGHLIGHT "\color\"
    IF Console = "RESPONSE"
        ACTION ALL EVENT-REPORT
"TYPE=LG|CLASS=Host|INSTANCE=\LogName\|APPL=$CONSOLE$|APPLQUAL=RC_Tim
er_1|TEXT=\_MESSAGE\"
    ENDIF
END
```

Accordingly, the present invention provides, among other aspects, a system and method for automating complex operations of a computing arrangement. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for automating operations of a computing arrangement coupled to a message processor, wherein the computing arrangement includes a host data processing system coupled to a data storage system, and an operations processor coupled to the host and to the data storage system, comprising:

defining a plurality of command queues in a pattern database, each command queue having a priority level relative to the other command queues and having storage available for a plurality of commands;

defining in the pattern database a plurality of pattern definitions and response definitions, each pattern definition being associated with one or more associated response definitions, and one or more of the response definitions including one or more commands and one or more instructions, wherein each of the one or more instructions specifies queuing of a command to a designated one of the command queues;

receiving message character strings at the message processor;

searching the pattern database for pattern definitions that match the message character strings;

for each pattern definition that matches a received message character string and in response to an instruction associated with the pattern definition and that designates a selected command queue, adding the command specified by the instruction to the selected command queue; and for a pattern definition that matches a command prompt message character string from the data storage system, dequeuing commands from the command queues in order of the priority levels of the command queues and submitting the commands to the data storage system.

2. The method of claim 1, wherein the plurality of pattern definitions includes a first definition matching a selected first message character string from the host, the first message character string associated with a selected high-level operation of the data storage system, the pattern definitions further including a plurality of definitions matching selected message character strings from the data storage system generated in performing the high-level operation and having associated responses that are commands required for the high-level operation.

3. The method of claim 2, further comprising:

establishing a terminal emulation session between the operations processor and the data storage system;

transmitting the command prompt message character strings from the data storage system to the operations processor; and submitting the commands to the data storage system via the terminal emulation session.

4. The method of claim 1, further comprising:

defining the command queue as a character string; and adding character strings representing the commands to the command queue and delimiting the character strings with a selected character.

5. The method of claim 4, wherein the plurality of pattern definitions includes a first definition matching a selected first message character string from the host, the first message character string associated with a selected high-level operation of the data storage system, the pattern definition further including a plurality of definition matching selected messages from the data storage system generated in performing the high-level operation and having associated responses that are commands required for the high-level operation.

6. The method of claim 4, further comprising:

establishing a terminal emulation session between the operations processor and the data storage system;

transmitting the command prompt message character strings from the data storage system to the operations processor; and submitting the commands to the data storage system via the terminal emulation session.

7. An apparatus for automating operations of a computing arrangement coupled to a message processor, wherein the computing arrangement includes a host data processing system coupled to a data storage system, and an operations processor coupled to the host and to the data storage system, comprising:

means for defining a plurality of command queues in a pattern database, each command queue having a priority level relative to the other command queues and having storage available for a plurality of commands;

means for defining in the pattern database a plurality of pattern definitions and response definitions, each pattern definition being associated with one or more associated response definitions, and one or more of the response definitions including one or more commands and one or more instructions, wherein each of the one or more instructions specifies queuing of a command to a designated one of the command queues;

means for receiving message character strings at the message processor;

means for searching the pattern database for pattern definitions that match the message character strings; and means, responsive to each pattern definition that matches a received message character string and responsive to an instruction associated with the pattern definition and that designates a selected command queue, for adding the command specified by the instruction to the selected command queue; and means, responsive to a pattern definition that matches a command prompt message character string from the data storage system, for dequeuing commands from the command queues in order of the priority levels of the command queues and submitting the commands to the data storage system.

8. A computing arrangement having automation of complex manual operations, comprising:

a host data processing system;

a data storage arrangement coupled to the data processing system;

a pattern-response database configured with a plurality of command queues, a plurality of pattern definitions, and a plurality of response definitions, each command queue having a priority level relative to the other command queues and having storage available for a plurality of commands, each pattern definition being associated with one or more associated response definitions, and one or more of the response definitions including one or more commands and one or more instructions, wherein each of the one or more instructions specifies queuing of a command to a designated one of the command queues;

a message processor coupled to the pattern-response database, the host system, and to the data storage arrangement, the message processor configured to search the pattern-response database for pattern definitions that match input message character strings, for each pattern definition that matches a received message character string and in response to an instruction associated with the pattern definition and that designates a selected command queue, add the command specified by the instruction to the selected command queue, and for a pattern definition that matches a command prompt message character string from the data storage system, dequeue commands from the command queues in order of the priority levels of the command queues and submit the commands to the data storage system.

* * * * *